United States Patent
Tachiki et al.

(10) Patent No.: US 10,640,677 B2
(45) Date of Patent: May 5, 2020

(54) COATING AGENT, SURFACE-COATED ELASTIC BODY, AND SURFACE-COATED RUBBER METAL LAMINATE

(71) Applicant: NICHIAS CORPORATION, Tokyo (JP)

(72) Inventors: Jun Tachiki, Tokyo (JP); Tomokazu Watanabe, Tokyo (JP); Hideharu Aoyagi, Tokyo (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 16/069,935

(22) PCT Filed: Jan. 6, 2017

(86) PCT No.: PCT/JP2017/000238
§ 371 (c)(1),
(2) Date: Jul. 13, 2018

(87) PCT Pub. No.: WO2017/122585
PCT Pub. Date: Jul. 20, 2017

(65) Prior Publication Data
US 2018/0371288 A1 Dec. 27, 2018

(30) Foreign Application Priority Data
Jan. 15, 2016 (JP) .................................. 2016-006195

(51) Int. Cl.
| | |
|---|---|
| C09D 175/04 | (2006.01) |
| B32B 15/06 | (2006.01) |
| B32B 27/40 | (2006.01) |
| C09D 127/18 | (2006.01) |
| C09D 123/26 | (2006.01) |
| B32B 27/20 | (2006.01) |
| C09D 7/40 | (2018.01) |
| C09D 7/65 | (2018.01) |
| B32B 25/08 | (2006.01) |
| B32B 27/26 | (2006.01) |
| C08G 18/80 | (2006.01) |
| C08L 23/26 | (2006.01) |
| C08L 27/18 | (2006.01) |

(52) U.S. Cl.
CPC ............ *C09D 175/04* (2013.01); *B32B 15/06* (2013.01); *B32B 25/08* (2013.01); *B32B 27/20* (2013.01); *B32B 27/26* (2013.01); *B32B 27/40* (2013.01); *C09D 7/40* (2018.01); *C09D 7/65* (2018.01); *C09D 123/26* (2013.01); *C09D 127/18* (2013.01); *B32B 2255/10* (2013.01); *B32B 2255/26* (2013.01); *B32B 2307/554* (2013.01); *B32B 2307/746* (2013.01); *B32B 2581/00* (2013.01); *C08G 18/80* (2013.01); *C08L 23/26* (2013.01); *C08L 27/18* (2013.01)

(58) Field of Classification Search
CPC ............... C08L 75/04–14; C08L 23/26; C08L 27/12–20; C09D 175/04; C09D 123/26; C09D 127/12–20
See application file for complete search history.

(56) References Cited

U.S. PATENT DOCUMENTS

| | | | | |
|---|---|---|---|---|
| 2006/0115665 A1* | 6/2006 | Bolm | ...................... | C09D 5/033 428/480 |
| 2010/0136352 A1* | 6/2010 | Higashira | ............... | B32B 15/06 428/462 |
| 2013/0285334 A1 | 10/2013 | Kojima et al. | | |

FOREIGN PATENT DOCUMENTS

| | | | |
|---|---|---|---|
| CN | 103459141 A | | 12/2013 |
| JP | 3-252442 A | | 11/1991 |
| JP | 5-341494 A | | 12/1993 |
| JP | 11-138096 A | | 5/1999 |
| JP | 2002210867 A | * | 7/2002 |
| JP | 2003-213122 A | | 7/2003 |
| JP | 2008-189892 A | | 8/2008 |
| JP | 2008-260809 A | | 10/2008 |
| JP | 2009091384 A | * | 4/2009 |
| JP | 2009-275287 A | | 11/2009 |
| WO | 2012/096222 A1 | | 7/2012 |
| WO | 2015/198543 A1 | | 12/2015 |

OTHER PUBLICATIONS

International Search Report dated Feb. 14, 2017, issued in counterpart International Application No. PCT/JP2017/000238 (2 pages).
Office Action dated Sep. 23, 2019, issued in counterpart CN Application No. 201780006812.9, with English translation (12 pages).
Office Action dated Feb. 3, 2020, issued in counterpart KR Application No. 10-2018-7018855, with English translation (11 pages).
Office Action dated Mar. 6, 2020, issued in counterpart CN application No. 201780006812.9, with English translation. (12 pages).
Wang, Lan et al., "Polymer Materials", China Light Industry Publishing House, p. 345, Publication No. 20090131, with English translation, cited in CN Office Action dated Mar. 6, 2020. (5 pages).

* cited by examiner

*Primary Examiner* — Michael M Dollinger
(74) *Attorney, Agent, or Firm* — Westerman, Hattori, Daniels & Adrian, LLP

(57) ABSTRACT

A coating agent contains a particulate fluorocarbon polymer, an acid-modified polyolefin, a urethane resin, and a curing agent. The present invention provides a coating agent capable of forming a coat with high wear resistance under high contact pressure and high temperature conditions, a surface-coated elastic body obtained using the same, and a surface-coated rubber metal laminate.

9 Claims, No Drawings

COATING AGENT, SURFACE-COATED ELASTIC BODY, AND SURFACE-COATED RUBBER METAL LAMINATE

TECHNICAL FIELD

The present invention relates to a coating agent, more specifically to a coating agent for a surface coat on an elastic body for use in sealing materials and the like.

BACKGROUND ART

Coating films are provided on surfaces of rubber elastic bodies such as rubber-coated metal gaskets, bearing seals, oil seals, and O-rings for preventing sticking, preventing blocking, improving wear resistance, and other purposes. However, in spite of formation of these coating films, when exposed to engine vibration under high contact pressure and high temperature conditions of engine gaskets, the rubber coat on the gasket surface may become worn to cause gas leakage. Moreover, the rubber coat layer at a sliding portion of the rubber elastic body, such as a bearing seal or an oil seal, becomes worn due to repeated friction, which may cause oil leakage.

Then, in order to improve the wear resistance, various coating agents have been developed (for example, Patent Literatures 1 to 4).

CITATION LIST

Patent Literature

Patent Literature 1: Japanese Patent Application Laid-Open Publication No. H3-252442
Patent Literature 2: Japanese Patent Application Laid-Open Publication No. H5-341494
Patent Literature 3: Japanese Patent Application Laid-Open Publication No. 2008-260809
Patent Literature 4: Japanese Patent Application Laid-Open Publication No. 2008-189892

SUMMARY OF THE INVENTION

Problem to be Solved by the Invention

Unfortunately, the coats obtained from the coating agents in Patent Literatures 1 to 4 have low wear resistance against repeated friction resulting from contact with a member of the flange. In particular, the wear resistance is low against repeated friction resulting from contact with a member of the flange under high contact pressure and high temperature conditions.

An object of the present invention is therefore to provide a coating agent capable of forming a coat with high wear resistance under high contact pressure and high temperature conditions, a surface-coated elastic body obtained using the same, and a surface-coated rubber metal laminate.

Means for Solving the Problem

The problem described above is solved by the present invention as follows.

More specifically, the present invention (1) provides a coating agent containing a particulate fluorocarbon polymer, an acid-modified polyolefin, a urethane resin, and a curing agent.

The present invention (2) provides the coating agent (1) in which the particulate fluorocarbon polymer is particulate polytetrafluoroethylene.

The present invention (3) provides the coating agent of (1) or (2) in which the acid-modified polyolefin is acid-modified polyethylene.

The present invention (4) provides the coating agent of any one of (1) to (3) in which the urethane resin has a tensile strength equal to or greater than 35 N/mm$^2$.

The present invention (5) provides the coating agent of any one of (1) to (4) in which the curing agent is polyisocyanate.

The present invention (6) provides the coating agent of (5) in which the polyisocyanate is blocked polyisocyanate.

The present invention (7) provides the coating agent of any one of (1) to (6) in which the coating agent is used as a surface coating agent for an elastic body.

The present invention (8) provides a surface-coated elastic body including an elastic body and a cured product of the coating agent of any one of (1) to (7) formed on a surface of the elastic body.

The present invention (9) provides a surface-coated elastic body of (8) in which the surface-coated elastic body is a sealing material.

The present invention (10) provides a surface-coated rubber metal laminate at least having a metal plate, a rubber layer covering the metal plate, and a cured product of the coating agent of any one of (1) to (7) formed on a surface of the rubber layer.

Effects of the Invention

The present invention provides a coating agent capable of forming a coat with high wear resistance under high contact pressure and high temperature conditions, a surface-coated elastic body obtained using the same, and a surface-coated rubber metal laminate.

DESCRIPTION OF EMBODIMENTS

A coating agent of the present invention contains a particulate fluorocarbon polymer, an acid-modified polyolefin, a urethane resin, and a curing agent. The coating agent of the present invention is applied on a target surface and heated to be cured to form a coat of the cured product on the target surface.

The coating agent of the present invention contains at least a particulate fluorocarbon polymer and an acid-modified polyolefin as lubricants. The inclusion of a particulate fluorocarbon polymer and an acid-modified polyolefin as lubricants in the coating agent of the present invention increases the wear resistance of the cured product of the coating agent of the present invention under high contact pressure and high temperature conditions.

In the coating agent of the present invention, examples of a fluorocarbon polymer in the particulate fluorocarbon polymer include, but not limited to, polytetrafluoroethylene (PTFE), perfluoroalkoxy alkane (PFA), fluorinated ethylene propylene copolymer (FEP), ethylene tetrafluoroethylene copolymer (ETFE), ethylene chlorotrifluoroethylene copolymer (ECTFE), polychlorotrifluoroethylene (PCTFE), chlorotrifluoroethylene (CTFE), polyvinylidene fluoride (PVDF), and polyvinyl fluoride (PVF). Among these, polytetrafluoroethylene (PTFE) is preferable. The molecular weight of the fluorocarbon polymer is preferably 0.1 million to 10 million, particularly preferably 1 million to 10 million.

The average particle size of primary particles of the particulate fluorocarbon polymer is preferably equal to or smaller than 2 μm, particularly preferably 0.1 to 1.0 μm.

Examples of the particulate fluorocarbon polymer to be used for preparation of the coating agent of the present invention include, but not limited to, those dispersed in a solvent and those in the form of powder.

Examples of the acid-modified polyolefin in the coating agent of the present invention include acid-modified polyethylene, acid-modified polypropylene, and acid-modified polystyrene. Among these, acid-modified polyethylene is preferred. Since the acid-modified polyolefin improves adhesion with the underlying elastic body in the cured product of the coating agent of the present invention, the inclusion of acid-modified polyolefin in the coating agent of the present invention increases the wear resistance of the cured product of the coating agent of the present invention under high contact pressure and high temperature conditions.

The molecular weight of the acid-modified polyolefin is preferably 2000 or more, particularly preferably 5000 to 6000.

The acid-modified polyolefin to be used for preparation of the coating agent of the present invention is appropriately selected from those dispersed in a water solvent, those in the form of powder and the like.

The coating agent of the present invention contains a urethane resin and a curing agent as binders for retaining the particulate fluorocarbon polymer and the polyolefin in the cured product of the coating agent of the present invention.

Examples of the urethane resin in the coating agent of the present invention include, but not limited to, aromatic urethane resins, ester-based urethane resins, and ether-based urethane resins.

The aromatic urethane resin is a urethane resin having an aromatic group as a repeating unit. Examples of the aromatic group include substituted or unsubstituted $C_{6-14}$ aromatic hydrocarbon group. The ether-based urethane resin is a urethane resin having an ether bond as a repeating unit. The ester-based urethane resin is a urethane resin having an ester bond as a repeating unit.

The molecular weight of the urethane resin is preferably 1000 to 1000000. The tensile strength of the urethane resin is preferably equal to or greater than 35 N/mm$^2$, particularly preferably 50 to 100 N/mm$^2$. The tensile strength of the urethane resin within the above-noted range increases the wear resistance of the cured product of the coating agent of the present invention under high contact pressure and high temperature conditions.

The urethane resin may be a urethane resin not acid-modified or may be an acid-modified urethane resin. Examples of the acid-modification process include a process of heating in the air atmosphere and oxidizing, a process of using an acid, and a process of using an acid group such as hydroxy group and carboxyl group in polyol for use in polymerization of the urethane resin. A urethane resin not acid-modified is preferred as the urethane resin because the wear resistance of the cured product of the coating agent of the present invention is increased under high contact pressure and high temperature conditions.

The curing agent in the coating agent of the present invention cures when the coating agent of the present invention is applied on a coating target and heated, and the cured product serves as a binder that retains the lubricants in the cured product of the coating agent of the present invention.

Examples of the curing agent include polyisocyanates, epoxy compounds, oxazoline compounds, carbodiimide compounds, and melamine compounds. Among these, polyisocyanates are preferred because the wear resistance under high contact pressure and high temperature conditions is increased. Examples of the polyisocyanates include blocked polyisocyanates. Then, the curing agent is preferably a blocked polyisocyanate.

The proportion of the particulate fluorocarbon polymer in the solid content of the coating agent of the present invention is preferably 5 to 50% by mass, particularly preferably 5 to 20% by mass. The proportion of the particulate fluorocarbon polymer within the above-noted range in the solid content of the coating agent increases the wear resistance of the cured product of the coating agent of the present invention under high contact pressure and high temperature conditions.

The proportion of the acid-modified polyolefin in the solid content of the coating agent of the present invention is preferably 5 to 50% by mass, particularly preferably 10 to 30% by mass. The proportion of the polyolefin within the above-noted range in the solid content of the coating agent increases the wear resistance of the cured product of the coating agent of the present invention under high contact pressure and high temperature conditions.

The total proportion of the particulate fluorocarbon polymer and the polyolefin in the solid content of the coating agent of the present invention is preferably 15 to 75% by mass, particularly preferably 15 to 40% by mass. The proportion of the particulate fluorocarbon polymer and the polyolefin within the above-noted range in the solid content of the coating agent increases the wear resistance of the cured product of the coating agent of the present invention under high contact pressure and high temperature conditions.

The ratio of the amount of polyolefin content to the amount of particulate fluorocarbon polymer in the solid content of the coating agent of the present invention (polyolefin/particulate fluorocarbon polymer) is preferably 0.1 to 3.0, particularly preferably 1.0 to 2.0. The ratio of the amount of polyolefin to the amount of particulate fluorocarbon polymer within the above-noted range in the solid content of the coating agent increases the wear resistance of the cured product of the coating agent of the present invention under high contact pressure and high temperature conditions.

The proportion of the urethane resin in the solid content of the coating agent of the present invention is preferably 5 to 50% by mass, particularly preferably 15 to 40% by mass. The proportion of the urethane resin within the above-noted range in the solid content of the coating agent increases the wear resistance of the cured product of the coating agent of the present invention under high contact pressure and high temperature conditions.

The proportion of the curing agent in the solid content of the coating agent of the present invention is preferably 10 to 60% by mass, particularly preferably 30 to 60% by mass. The proportion of the curing agent within the above-noted range in the solid content of the coating agent increases the wear resistance of the cured product of the coating agent of the present invention under high contact pressure and high temperature conditions.

The total proportion of the urethane resin and the curing agent in the solid content of the coating agent of the present invention is preferably 15 to 85% by mass, particularly preferably 60 to 85% by mass. The total proportion of the urethane resin and the curing agent within the above-noted range in the solid content of the coating agent increases the wear resistance of the cured product of the coating agent of the present invention under high contact pressure and high temperature conditions.

The ratio of the amount of curing agent to the amount of urethane resin (curing agent/urethane resin) in the solid content of the coating agent of the present invention is preferably 0.2 to 4.0, particularly preferably 0.6 to 2.0. The ratio of the amount of curing agent to the amount of urethane resin in the solid content of the coating agent increases the wear resistance of the cured product of the coating agent of the present invention under high contact pressure and high temperature conditions.

The coating agent of the present invention may contain, in addition to the particulate fluorocarbon polymer, the polyolefin, the urethane resin, and the curing agent, a lubricant other than the particulate fluorocarbon polymer and the polyolefin, a binder other than the urethane resin and the curing agent, a surfactant, and the like. Examples of the lubricant other than the particulate fluorocarbon polymer and the polyolefin include graphites such as vein graphite, amorphous graphite, and synthetic graphite, silicone oil, and molybdenum disulfide. Examples of the binder other than the urethane resin and the curing agent include silicone resins and NBR.

The coating agent of the present invention usually does not include a cellulose derivative. Cellulose derivatives have low wear resistance during heating and low dispersiveness in an organic solvent and therefore may reduce the strength of the cured product. Examples of cellulose derivatives include methylcellulose, ethyl cellulose, carboxymethyl cellulose, carboxymethyl ethyl cellulose, hydroxyethyl cellulose, hydroxypropyl cellulose, and ethyl hydroxyethyl cellulose.

The coating agent of the present invention is a dispersive liquid in which the solid content as described above, specifically, the particulate fluorocarbon polymer, the polyolefin, the urethane resin and the curing agent, and, if necessary, a component other than the particulate fluorocarbon polymer, the polyolefin, the urethane resin, and the curing agent are dispersed in a solvent. The solvent may be either water or an organic solvent. Examples of the organic solvent include aromatic hydrocarbons, esters, and ketones, more specifically, toluene, xylene, ethyl acetate, butyl acetate, acetone, methyl ethyl ketone, methyl isobutyl ketone, di-n-propyl ketone, cyclohexanone, phorone, isophorone, ethyl cellosolve, and methyl cellosolve.

The solid content concentration in the coating agent of the present invention is selected as appropriate according to the purpose of use, usually 5 to 30% by mass, preferably 10 to 20% by mass.

The coating agent of the present invention is prepared, for example, but not limited to, by adding the components described above to a solvent and stirring to disperse the solid content in the solvent.

The coating agent of the present invention is applied on a target surface, dried, and then heated to be cured, thereby forming a coat of the cured product of the coating agent of the present invention on the target surface. That is, the coating agent of the present invention is used as a surface coating agent to form a coat of a cured product on a target surface.

The target to be coated with a coat of the cured product of the coating agent of the present invention is, for example, an elastic body. Examples of the elastic body include fluorocarbon rubber, nitrile rubber (NBR), hydrogenated NBR, ethylene-propylene(-diene) rubber, styrene-butadiene rubber, acrylic rubber, chloropropylene rubber, butyl rubber, and natural rubber. For example, the coating agent of the present invention is used for forming a cured coat on the surface of a rubber elastic body such as a rubber-coated metal gasket, a bearing seal, an oil seal, and an O-ring.

The hardness of the elastic body is usually 10 to 200 N/mm$^2$. The hardness is Martens hardness measured, for example, using a nanoindentation tester ENT-2100 (manufactured by Elionix Inc.) using a Berkovich tip.

The coating agent of the present invention is applied on a target surface, for example, by immersing a target in the coating agent of the present invention, or by applying the coating agent of the present invention on a target surface by a spray, a roll coater, ink jetting, or the like.

The coating agent of the present invention is applied on a target surface and then dried to remove the solvent, followed by heating at 100 to 300° C. to form a coat of the cured product of the coating agent of the present invention on the target surface. The heating temperature for curing is selected as appropriate according to the kind of curing agent.

The thickness of the coat of the cured product of the coating agent of the present invention formed on a target surface is selected as appropriate, usually 0.5 to 10 μm, preferably 1 to 6 μm.

The surface-coated elastic body of the present invention includes an elastic body and a cured product of the coating agent of the present invention formed on a surface of the elastic body. The elastic body in the surface-coated elastic body of the present invention is similar to the elastic body for the coating agent of the present invention.

The surface-coated rubber metal laminate of the present invention at least has a metal plate, a rubber layer covering the metal plate, and a cured product of the coating agent of the present invention formed on a surface of the rubber layer.

The surface-coated rubber metal laminate of the present invention has a coat of the cured product of the coating agent of the present invention on a surface of a rubber metal laminate.

Examples of the rubber metal laminate include a laminate including a metal plate, a metal-treated layer, an adhesive layer, and a rubber layer in this order; and a laminate including a metal plate, an adhesive layer, and a rubber layer in this order. That is, in the rubber metal laminate, a metal plate is covered with a rubber layer, and the rubber layer is formed to cover the metal plate such that an adhesive formed on the surface of the metal plate is interposed, or a metal-treated layer formed on the surface of the metal plate and an adhesive layer formed on the surface of the metal-treated layer are interposed.

Examples of the metal plate in the surface-coated rubber metal laminate of the present invention include stainless steel plates, mild steel plates, zinc-plated steel plates, SPCC steel plates, copper plates, magnesium plates, aluminum plates, and aluminum die cast plates.

The metal-treated layer in the surface-coated rubber metal laminate of the present invention is formed on the surface of the metal plate. Examples of the metal-treated layer include a zinc phosphate coat, a ferric phosphate coat, an applied chromate coat, and a coat containing one or more of vanadium compounds, zirconium compounds, titanium compounds, molybdenum compounds, tungsten compounds, manganese compounds, zinc compounds, and cerium compounds. Examples of the metal-treated layer include a metal-treated layer formed of a metal-treated layer-forming agent containing an organic metal compound having at least one or more chelate rings and an alkoxy group, and a metal-treated layer formed of a metal-treated layer-forming agent containing a metal oxide or silica, preferably, a metal-treated layer formed of a metal-treated layer-forming agent containing an amino group-containing alkoxysilane and a vinyl group-containing alkoxysilane.

The adhesive layer in the surface-coated rubber metal laminate of the present invention is formed on a surface of a metal plate, or when a metal-treated layer is formed, on a surface of a metal-treated layer. The adhesive layer is formed using a vulcanizing adhesive suited for the kind of rubber to be bonded. When the rubber forming the rubber layer is NBR, examples of the vulcanizing adhesive include vulcanizing adhesives such as silanes, phenol resins, epoxy resins, and urethane resins.

Examples of the rubber forming the rubber layer in the surface-coated rubber metal laminate of the present invention include nitrile rubber (NBR), hydrogenated nitrile rubber (H-NBR), or functional group-modified nitrile rubber (hereinafter may simply be referred to as "NBR") or a foam rubber thereof. Foam rubber is preferably quinoid-cured rubber because if so, the problem of metal corrosion caused by free sulfur is eliminated. Examples of the crosslinking agent include p-quinone dioxime, and p,p'-dibenzoylquinone dioxime. It is preferable that the crosslinking agent is used in combination with a crosslinking accelerator because if so, the crosslinking efficiency is increased. NBR preferably includes a pyrolytic foaming agent or a non-cross linkable, thermally expandable microcapsule, in view of foaming. The foam ratio is preferably 1.2 to 5, particularly preferably 1.5 to 3. The foam ratio is a ratio between the thickness of the rubber layer before foaming and the thickness after foaming. NBR preferably includes a filler such as carbon black.

The rubber layer may be provided, for example, by blending predetermined amounts of a crosslinking additive, foaming agent, filler, and other additives in NBR to produce a rubber compound, dissolving and dispersing this compound in an organic solvent such as toluene to prepare a coating liquid, and applying the coating liquid on a metal plate to foam the coating liquid.

The thickness of the rubber layer is preferably 10 to 70 μm, particularly preferably 10 to 30 μm.

EXAMPLE

Example 1

<Preparation of Rubber Metal Laminate>
A stainless steel plate (SUS304) having a thickness of 0.2 mm was used as a metal plate. After the surface of the stainless steel plate was treated with an alkaline degreaser, a phosphate-based agent was used to form an anti-rust coat (metal-treated layer) of ferric phosphate on both surfaces of the metal plate. Subsequently, an adhesive layer mainly composed of a phenolic resin and modified by an NBR rubber compound was formed on the surface of the anti-rust coat.

Subsequently, on the surface of the adhesive layer, a rubber compound liquid having the composition below was applied to a predetermined thickness and dried in a hot air circulating oven at 60° C. for 1 minute to yield a rubber metal laminate unvulcanized product.

<Rubber Compound Composition>

| | |
|---|---|
| Nitrile rubber | 100 phr |
| Hydrozincite | 5 phr |
| Stearic acid | 0.5 phr |
| Carbon | 80 phr |
| Coumarone-indene resin | 3 phr |
| Antioxidant | 2 phr |
| Plasticizer | 10 phr |
| Sulfur | 3 phr |
| Vulcanization accelerator | 2 phr |

<Preparation of Coating Agent>
The components each having a proportion in the solid content as shown in Table 1 were added to a solvent toluene, acetate butyl, and acetate ethyl to prepare a coating agent having a solid content concentration of 30% by mass. The components of the solid content used in preparation of the coating agent are as follows.

(Lubricant)
Particulate polytetrafluoroethylene: average particle size of 0.3 μm, molecular weight of 1 million to 10 million
Acid-modified polyethylene: molecular weight of 5000 to 6000
Fischer-Tropsch wax: average particle size of 0.4 μm, melting point of 112° C.

(Urethane Resin)
Urethane resin A: tensile strength of 68 $N/mm^2$, urethane resin
Urethane resin B: acid-modified urethane resin (Curing Agent)
Block isocyanate: dissociation temperature of 120° C. or higher, brown liquid <Formation of Coat of Cured Product>
The coating agent was applied on the surface of the rubber metal laminate unvulcanized product and heated in a hot air circulating oven at 240° C. for 10 minutes to produce a surface-coated rubber metal laminate having a cured product coat on the surface of the rubber metal laminate. The thickness of the cured product coat of the coating agent was 1 μm, and the surface hardness of the rubber metal laminate was 35 $N/mm^2$.

<Evaluation of Wear Resistance>
The following test was performed on the surface-coated rubber metal laminate. The result is shown in Table 1.

The surface-coated rubber metal laminate was cut into a width of 50 mm and a length of 80 mm to prepare a test piece. Subsequently, a reciprocating movement test was performed using a pin-on-disk friction and wear testing machine FPR-2100 manufactured by RHESCA Co., LTD. and using a pin with a radius R5 as a counterpart under the conditions of linear velocity of 63.25 mm/sec, reciprocating rotation radius of R40, reciprocating rotation angle of 36°, load of 5000 g (25° C.) or load of 2500 g (150° C.). The number of times was counted until the cured product coat of the coating agent and the rubber layer become worn and the metal surface was exposed.

TABLE 1

| | Example 1 | Comparative Example 1 | Comparative Example 2 |
|---|---|---|---|
| Proportion of each component in solid content (% by mass) | | | |
| Particulate polytetrafluoroethylene | 10.00 | — | — |
| Acid-modified polyethylene | 15.00 | — | 25.00 |
| Fischer-Tropsch wax | — | 23.08 | — |
| Urethane resin A | 37.50 | — | — |

TABLE 1-continued

|  | Example 1 | Comparative Example 1 | Comparative Example 2 |
|---|---|---|---|
| Urethane resin B | — | 38.46 | 18.75 |
| Block isocyanate | 37.50 | 38.46 | 56.25 |
| Wear characteristics (number of times) | | | |
| 25° C. | 550 | 498 | 243 |
| 150° C. | 1526 | 196 | 1394 |

The invention claimed is:

1. A coating agent comprising: a particulate fluorocarbon polymer, an acid-modified polyolefin, a urethane resin, and a curing agent,
    wherein the urethane resin has a tensile strength equal to or greater than 35 N/mm$^2$.

2. The coating agent according to claim 1, wherein the particulate fluorocarbon polymer is particulate polytetrafluoroethylene.

3. The coating agent according to claim 1, wherein the acid-modified polyolefin is acid-modified polyethylene.

4. The coating agent according to claim 1, wherein the curing agent is polyisocyanate.

5. The coating agent according to claim 4, wherein the polyisocyanate is blocked polyisocyanate.

6. The coating agent according to claim 1, wherein the coating agent is used as a surface coating agent for an elastic body.

7. A surface-coated elastic body comprising an elastic body and a cured product of the coating agent of claim 1 formed on a surface of the elastic body.

8. The surface-coated elastic body according to claim 7, wherein the surface-coated elastic body is a sealing material.

9. A surface-coated rubber metal laminate comprising at least a metal plate, a rubber layer covering the metal plate, and a cured product of the coating agent of claim 1 on a surface of the rubber layer.

* * * * *